United States Patent [19]

Montalvo, Sr.

[11] 4,442,930

[45] Apr. 17, 1984

[54] AIR ACTUATED FORCE INTENSIFYING PISTON AND CYLINDER ASSEMBLY FOR BRAKES AND CLUTCHES

[76] Inventor: Edwin J. Montalvo, Sr., 200 Riverside Industrial Pkwy., Portland, Me. 04103

[21] Appl. No.: 273,760

[22] Filed: Jun. 15, 1981

[51] Int. Cl.³ .............................. F16D 25/04
[52] U.S. Cl. ................. 192/85 AB; 192/93 R; 192/70; 192/20; 188/72.2; 188/72.6; 92/136
[58] Field of Search .............. 192/85 R, 93 R, 70, 192/20, 85 AB, 82 P, 88 A; 188/72.2, 72.4, 188, 72.6, 368; 74/516; 92/136, 138

[56] References Cited

U.S. PATENT DOCUMENTS

| | | | |
|---|---|---|---|
| 946,123 | 1/1910 | Geisenhower | 192/93 R X |
| 3,266,602 | 3/1965 | Belart et al. | 188/72.6 |
| 3,342,290 | 9/1967 | Klaue | 192/85 AB |
| 4,089,393 | 5/1978 | Falk | 188/72.6 |
| 4,175,651 | 11/1979 | Montalvo | 192/88 A |
| 4,354,424 | 10/1982 | Nordlund | 92/136 |

Primary Examiner—Rodney H. Bonck
Assistant Examiner—James J. Merek
Attorney, Agent, or Firm—Brooks, Haidt, Haffner & Delahunty

[57] ABSTRACT

A double-acting, floating, frictional coupling mechanism including an air-operated diaphragm-type piston with integral rack guided for axial movement in meshed engagement with a rotatably connected pinion. A cam on the pinion shaft cooperates with a second piston and intensifies the force transmitted through the rack and pinion by the air-operated piston.

13 Claims, 10 Drawing Figures

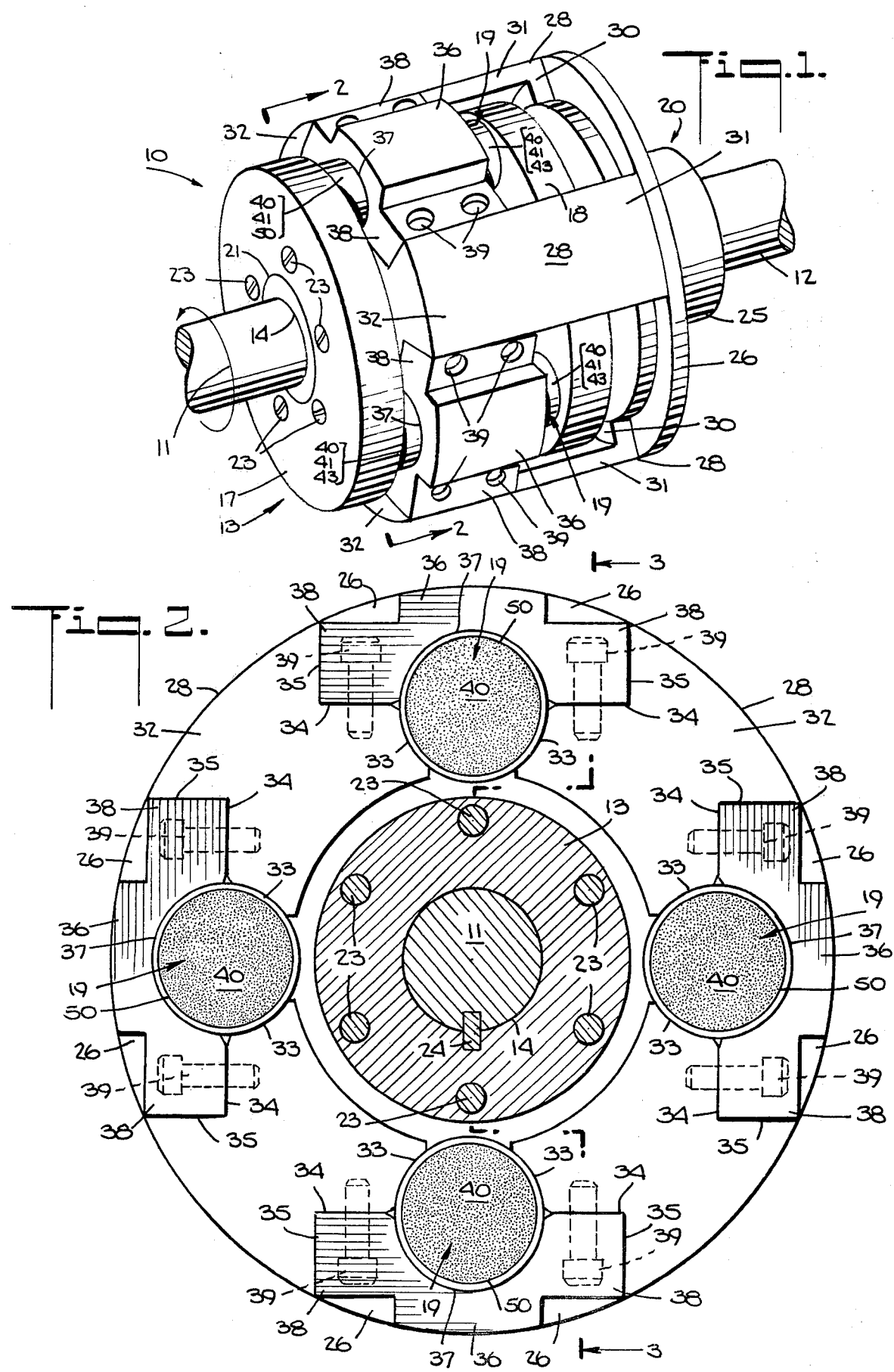

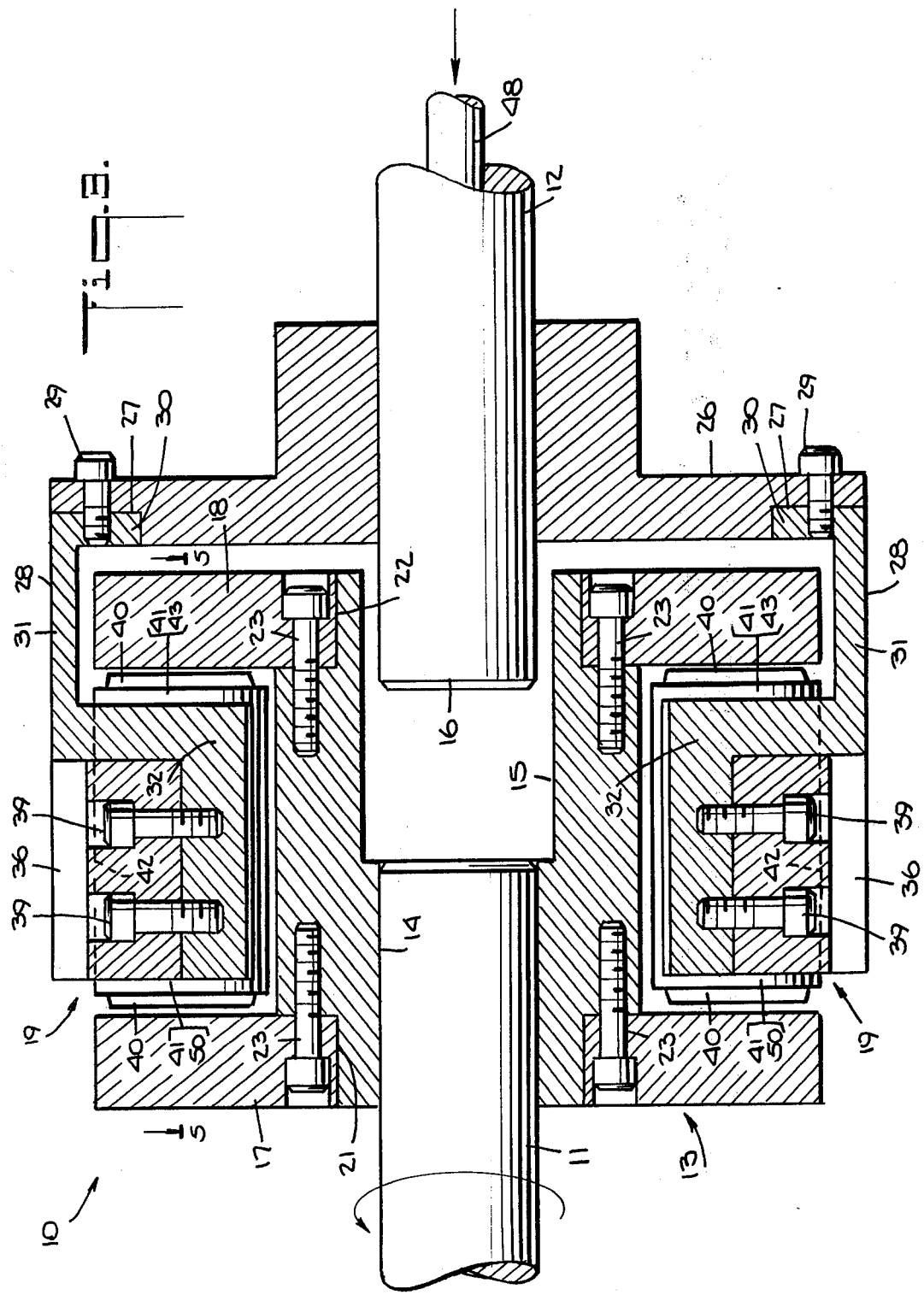

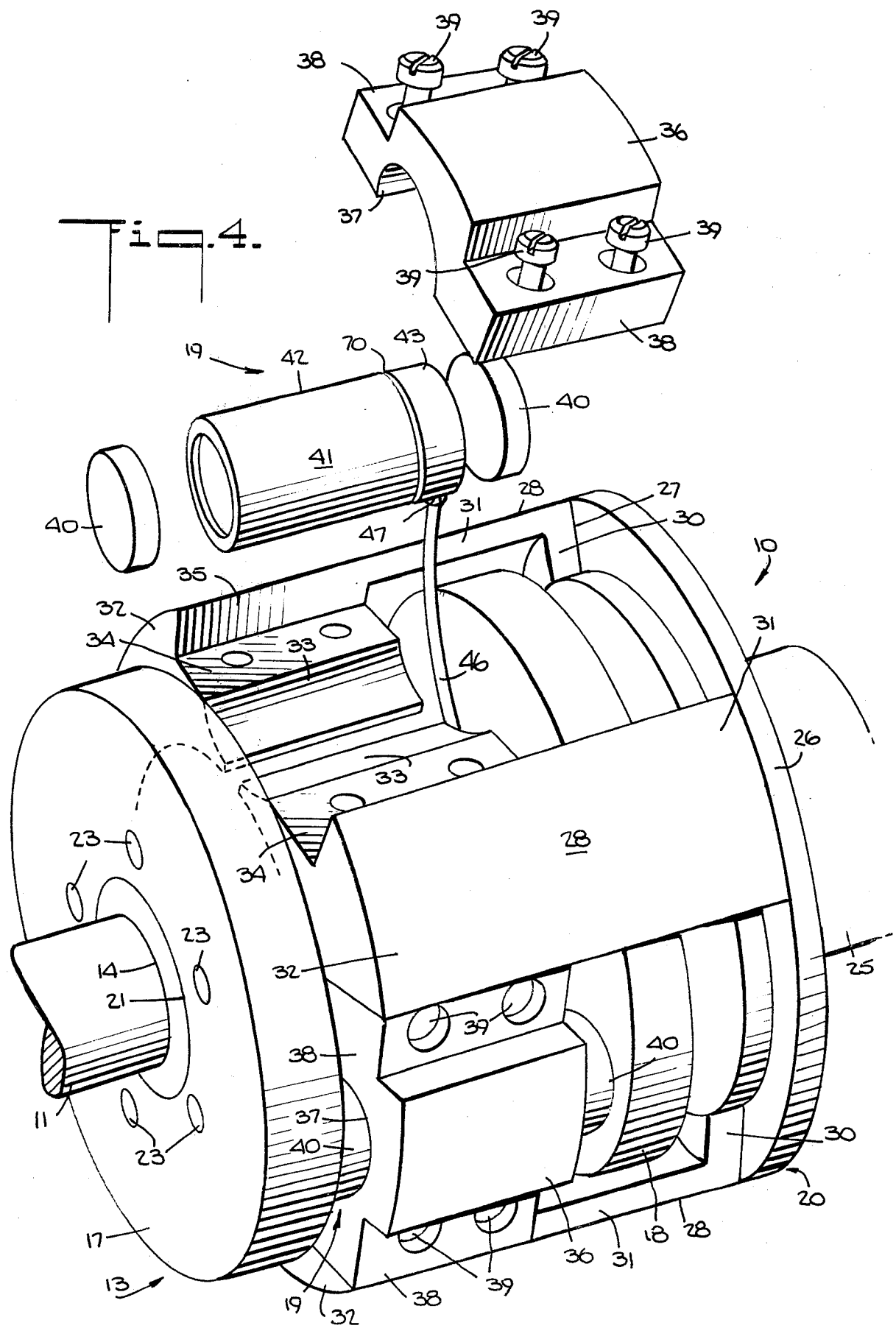

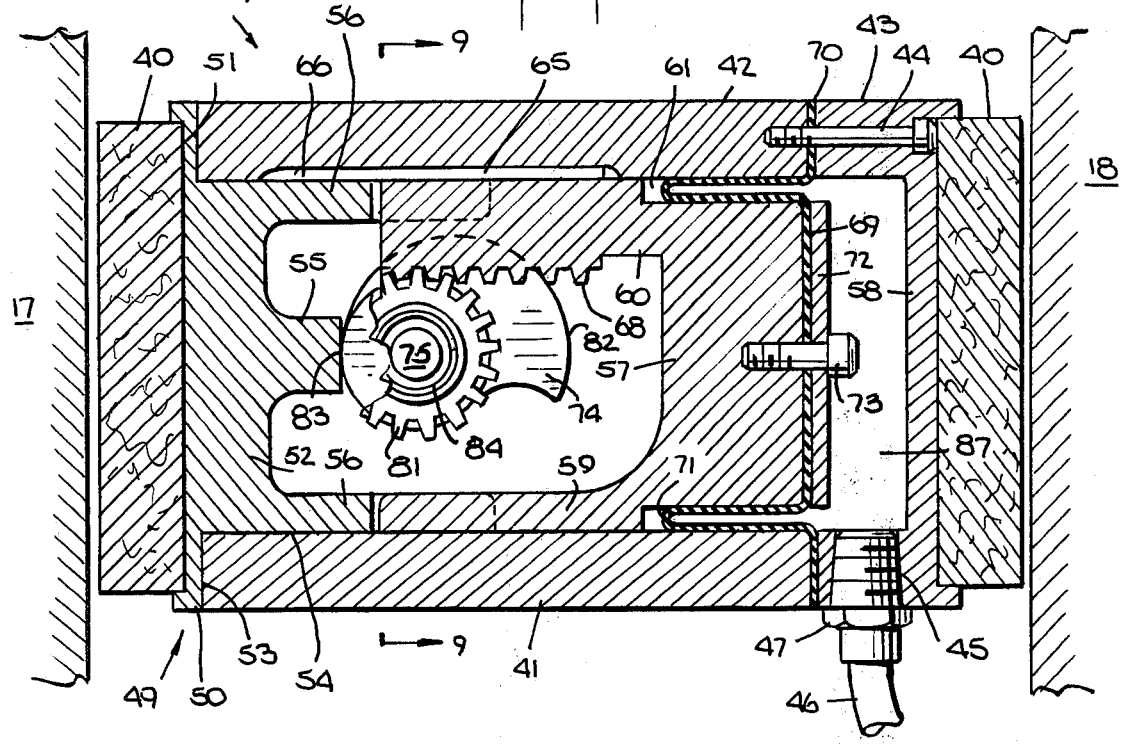
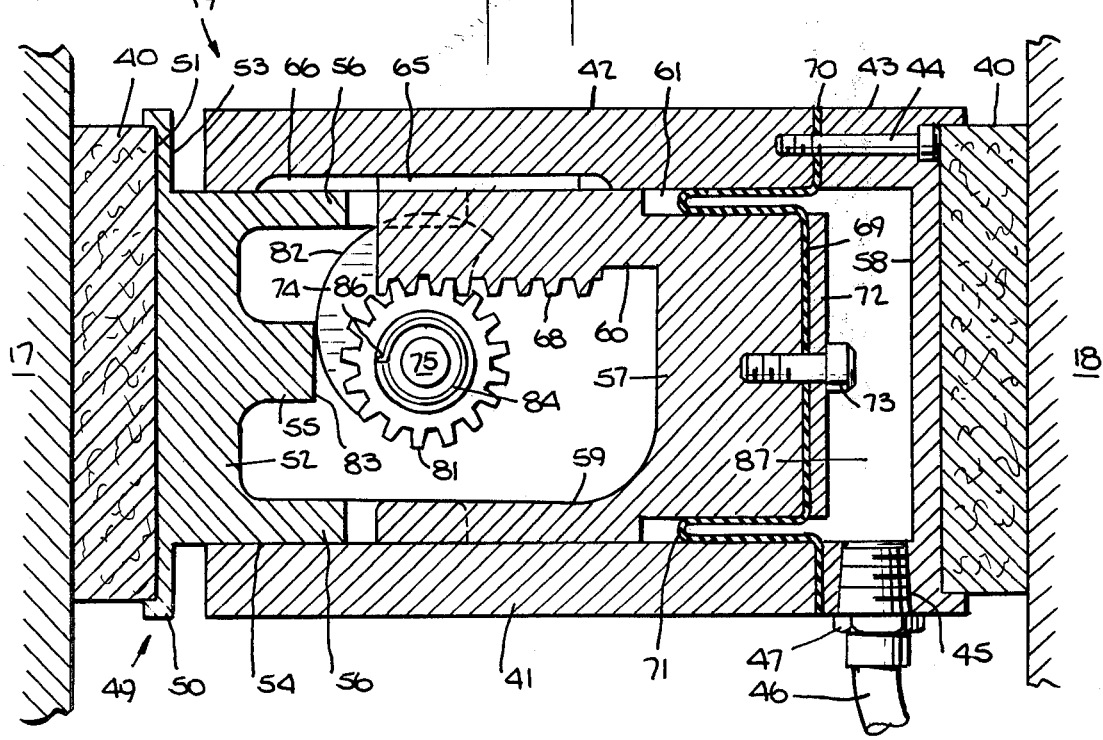

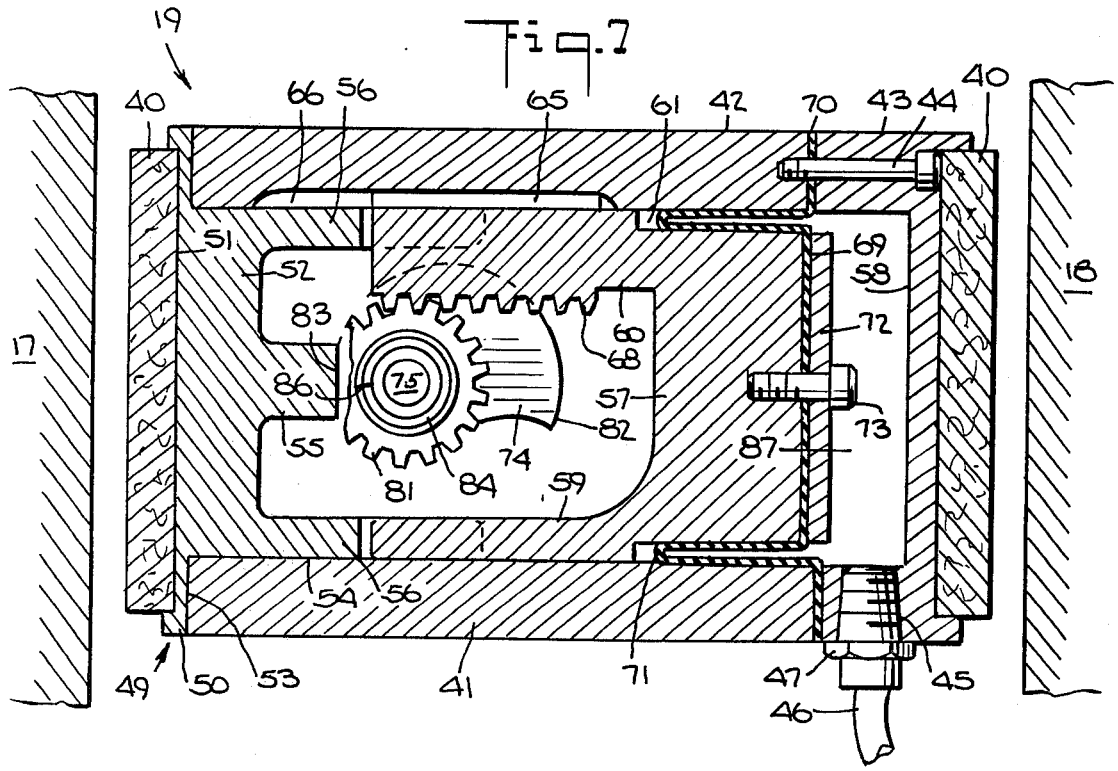
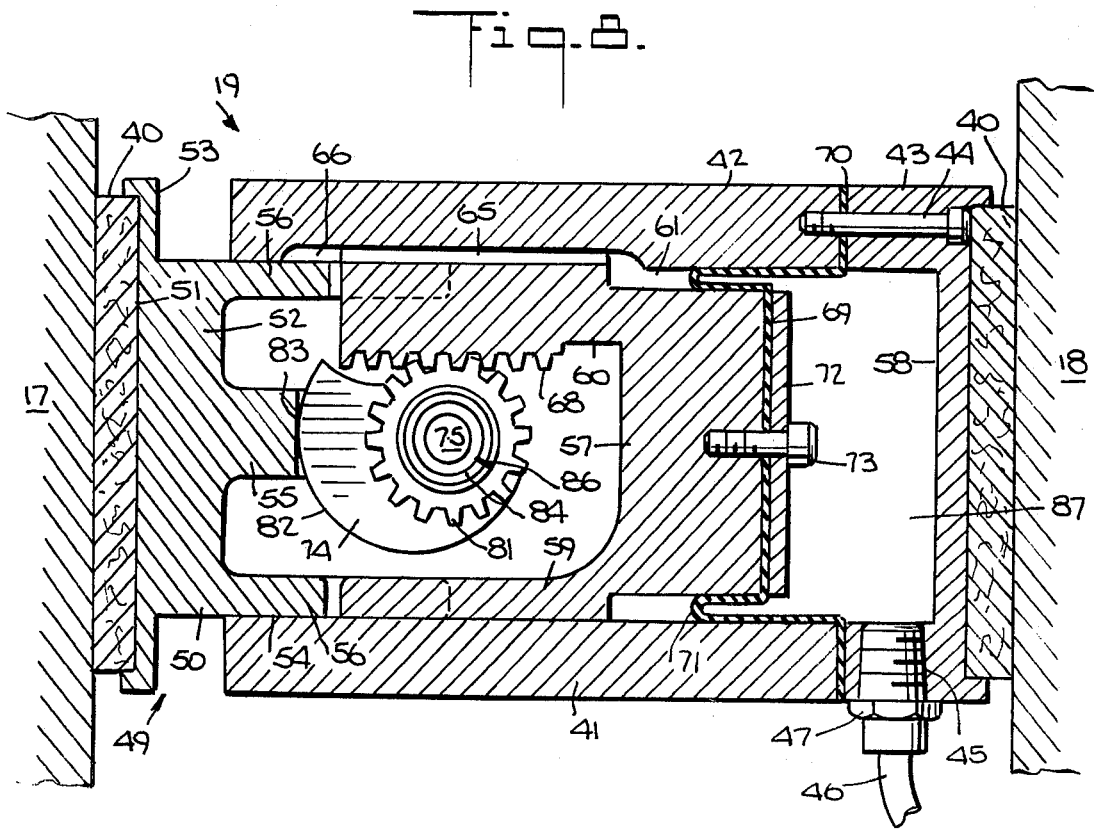

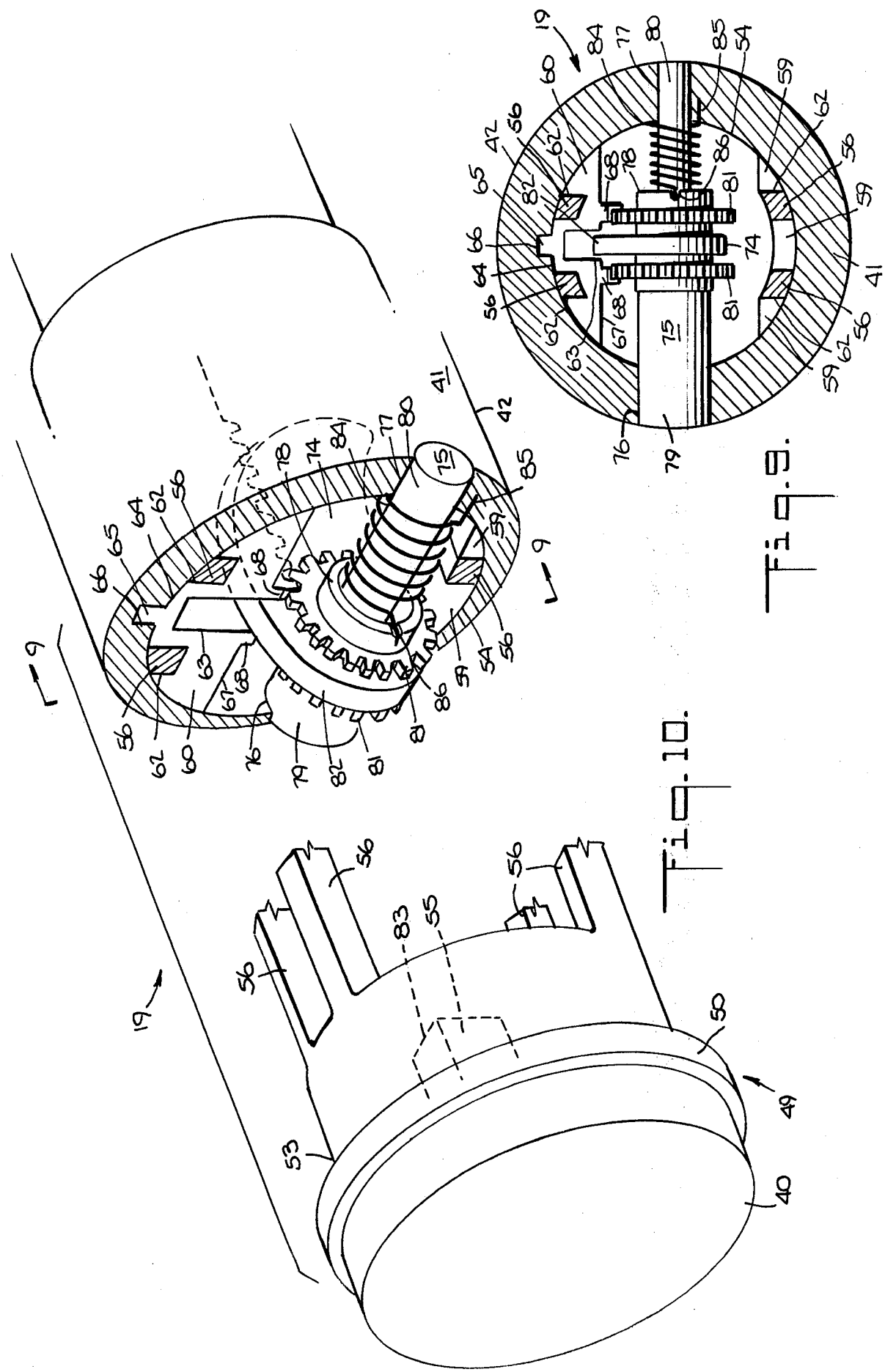

AIR ACTUATED FORCE INTENSIFYING PISTON AND CYLINDER ASSEMBLY FOR BRAKES AND CLUTCHES

BACKGROUND OF THE INVENTION

1. Field of the Invention

The present invention relates to friction coupling mechanisms such as brakes wherein a rotatable element is frictionally coupled to a relatively nonrotatable element and clutches wherein two relatively rotatable elements are coupled and uncoupled. More particularly, the invention relates to friction coupling mechanisms wherein a cam is used to achieve force multiplication in an air-actuated force intensifying piston and cylinder assembly.

2. Description of the Prior Art

Hydraulic and hydraulic-pneumatic brakes and clutches having friction members driven outwardly in opposite directions to engage opposed discs have been described in Suppes et al, U.S. Pat. Nos. 3,237,738 and 3,311,205 and 3,584,717, as well as in Montalvo, U.S. Pat. Nos. 3,696,900 and 4,175,651. The devices disclosed in those patents are compact and easy to service. The present invention incorporates advantageous features shown in the above identified patents, and more specifically, the present invention represents an improvement upon the piston and cylinder assembly disclosed and claimed in Montalvo U.S. Pat. No. 4,175,651, the disclosure of which is incorporated by reference herein in its entirety.

Force multiplication, as applied to brakes and clutches, is not a new concept. Bauman, U.S. Pat. No. 3,268,038 discloses a vehicular braking mechanism which utilizes differential area pistons in a wheel cylinder wherein applied braking force is intensified for actuation of the vehicle's brake shoes. Montalvo U.S. Pat. No. 4,175,651 discloses a friction coupling mechanism for use in brakes and clutches where force intensification is achieved by use of a compound piston arrangement, and Falk U.S. Pat. Nos. 4,089,393 and 4,154,321 disclose a disc brake system where force multiplication is achieved through use of a pair of cams mounted on a movable cam carrier.

The concept that when a force is directly applied to one of two opposed friction shoes or pads, there is a simultaneous application of an equal reaction force indirectly imposed on the other shoe, by reason of a self-aligning piston and cylinder assembly, is also not a novel concept, as the same has been suggested in Montalvo U.S. Pat. No. 4,175,651.

Despite the wide variety of prior art clutches and brakes, there continues to be a real need for improved friction coupling mechanisms that combine compactness with high torque capability, especially for industrial applications where space is limited.

SUMMARY OF THE INVENTION

The friction clutch or brake of this invention incorporates a force multiplying piston and cylinder assembly wherein force multiplication is achieved through use of a single cam fixed for rotation within the cylinder housing. This assembly constitutes an improvement upon the piston and cylinder assembly covered by U.S. Pat. No. 4,175,651, which uses dual diameter pistons with mercury or other seepage resistant liquid confined therebetween for the force multiplication effect. There is a substantial advantage in using the piston and cylinder assembly of the present invention because there is no need to be concerned with elaborate sealing techniques and/or with use of liquids having high surface tension properties, since the present assembly does not require use of a hydraulic fluid for its operation.

In a preferred embodiment of the invention there are a plurality of piston-cylinder assemblies arranged to "float" for double-acting axial extension to engage opposed plates which can be considered as discs. Each double-acting piston-cylinder assembly constitutes a separate generally cylindrical module slidingly fitted into one of a plurality of equally arcuately spaced bores of a body for exertion of equal pressure by friction shoes or pads at opposite ends of the module against the discs when the clutch or brake is engaged.

Although a presently preferred embodiment of the invention in the form of a clutch is described in detail, it will be understood that the principles and structure of the invention are contemplated to have wide applicability to other uses where conventional pneumatic or hydraulic-pneumatic devices are now employed as linear actuators.

The piston-cylinder assembly shown has a diaphragm-type internal primary piston with integral rack guided for axial movement within the module under pneumatic pressure, which in a typical application is supplied by a plant air system.

Teeth on the rack mesh with teeth on a pinion, which pinion is mounted on a shaft having ends rotatably fixed to the cylinder housing wall. A cam is also mounted on the pinion shaft. The moving primary piston causes the teeth on the integral rack to run together with the teeth of the pinion, thus rotating the cam. A cam follower on a secondary piston cooperates with the cam, forcing a friction shoe, carried by the outer face of the secondary piston, against the first of two opposed friction discs for frictional engagement therewith. The cam action intensifies the force transmitted through the rack and pinion by the pressurized piston.

A second of the two friction shoes, carried by the end of the module, opposite to the outer face of the secondary piston, is then brought into frictional engagement with the second of the two opposed friction discs. Because the module is permitted to float between the two opposed discs, equal and opposite forces are then exerted by the friction shoes against their respective friction discs. This floating action also adjusts automatically for unequal wearing, if any, of the respective friction shoes.

When, as is preferred in brakes or clutches incorporating the piston and cylinder assembly of the invention, a plurality of modules are employed, each can be individually controlled by control of the air supply, if desired. The mounting arrangement for a brake or clutch is so structured as to facilitate access for inspection, maintenance or replacement of working parts. These and other applications, objects and advantages of the invention will be more fully understood from the following detailed description of a preferred embodiment of the invention, especially when that description is read in conjunction with the accompanying drawing figures illustrating a clutch according to the invention.

BRIEF DESCRIPTION OF THE DRAWINGS

In the accompanying drawings, in which like reference characters indicate like parts throughout:

FIG. 1 is an overall view in perspective of a clutch embodying piston-cylinder modules according to the invention;

FIG. 2 is a section view of the clutch of FIG. 1 taken along line 2—2 of FIG. 1 and looking in the direction of the arrows, with concealed parts indicated by dashed lines;

FIG. 3 is a view in section taken along line 3—3 of FIG. 2;

FIG. 4 is a partially exploded view of the clutch of FIG. 1 showing the manner of assembly of parts for easy service;

FIG. 5 is a detail view in section of a piston-cylinder module with new friction shoes in retracted condition, taken along line 5—5 of FIG. 3;

FIG. 6 is a view similar to FIG. 5 showing the piston-cylinder module in extended condition;

FIG. 7 is a view similar to FIG. 5 showing the piston-cylinder module with worn friction shoes;

FIG. 8 is a view similar to FIG. 6 showing the piston-cylinder module with worn friction shoes;

FIG. 9 is a cross-section view of a piston-cylinder module taken along line 9—9 of FIG. 10; and FIG. 10 is a partially exploded view in perspective of the piston-cylinder module of FIG. 5.

DETAILED DESCRIPTION OF A PREFERRED EMBODIMENT

The clutch generally designated by reference numeral 10 in the drawing is of the type used for selectively transmitting rotational motion from a driving element, shown as a shaft 11, to a driven element, shown as a shaft 12, which has its axis aligned with the axis of the shaft 11. It will be understood that if the output or driven element were replaced by a fixed element the device shown would function as a brake.

The reference numeral 13 in the drawings generally designates a rotor body affixed to the driving shaft 11 for rotation therewith. As best shown in FIG. 3 the rotor body 13 is generally cylindrical, with a central axial bore at 14 tightly fitted on the shaft 11, which bore widens at 15 to surround the end 16 of the output shaft 12, which is freely rotatable within the axial space at 15 where the rotor body 13 extends beyond the end of the driving shaft 11. Mounted on the rotor body 13, at opposite ends thereof, are a pair of flat ring-shaped plate members 17 and 18 which extend radially outward. The plate members 17 and 18, which rotate with the drive shaft 11, can be considered as a pair of opposed, parallel discs for engagement by double-acting outwardly extensible piston and cylinder assemblies generally designated 19 mounted between the plates 17 and 18 and arranged parallel to the axes of the shafts 11 and 12. These piston and cylinder assemblies are mounted on a piston carrier 20 secured to the output shaft 12 for rotation therewith. When the piston and cylinder assemblies 19 are in their extended condition, the rotor 13 is coupled to the piston carrier 20 and the output shaft 12 is driven to rotate with the drive shaft 11.

Attention is directed to the preferred manner of assembling the elements just described, as shown in FIG. 3. It will be seen that the rotor body 13 has annular steps 21 and 22 at its opposite ends for reception of the ring-like plates 17 and 18 which are secured to the rotor body 13 by a plurality of screws 23, the heads of which are preferably recessed as shown. The rotor body 13 and radially extending elements 17 and 18 could also be of unitary construction.

FIG. 2 shows that the rotor body 13 is keyed to the shaft 11 by a member 24.

The piston carrier 20 is keyed to the output shaft 12 and comprises an annular collar 25 with a radially extending peripheral flange 26. The flange 26 has an annular step area at 27 facing inwardly, and a plurality of legs 28 mounted at the area 27 are secured to the flange 26 by screws 29, as shown in FIG. 3. The legs 28 extend parallel to the axes of the shafts 11 and 12 for mounting of the piston and cylinder assemblies 19 upon and between adjacent legs 28. In the embodiment illustrated there are four piston and cylinder assemblies 19 and four legs 28 equally arcuately spaced about the shaft axes, but some other number could be provided.

FIGS. 1, 2 and 4 show that the legs 28 have foot portions 30, arcuate in shape and attached to the flange 26, an intermediate portion 31 formed as a segment of a cylinder extending past the plate 18 and leaving clearance for rotation of the plate 18, and a cylinder assembly mounting portion 32 that is shaped somewhat like the letter X in profile when viewed along a line parallel to the axis of rotation of the shaft 11.

The sectional view of FIG. 2 illustrates how the legs 28 receive the piston and cylinder assemblies 19 between arcuately curved areas 33 of the mounting portions 32 of adjacent legs 28, and the partially disassembled view of FIG. 4 can be compared with FIG. 2 to see how the parts 19 and 28 interfit. Radially outward of the curved areas 33, both longitudinal sides of the mounting portion 32 of each leg 28 are formed with a generally rectangular step having a flat base 34 and a flat wall 35, and the opposed stepped areas of adjacent legs 28 constitute a generally rectangular mounting space for demountable cap or cover members 36, which fit over the piston and cylinder assemblies 19. The cap 36, removed in FIG. 4, can be seen to have a curved interior area at 37 for embracing the piston and cylinder assembly 19 and a pair of wings 38 which in assembled condition, overlie the base areas 34 of the leg portions 32 and are secured thereto by pairs of screws 39 which fit into threaded bores of the leg portion 32 to secure the piston and cylinder assemblies 19 in place while permitting easy access to the assemblies 19 for inspection and maintenance, as shown in FIG. 4.

The friction coupling assembly described can, of course, be used with any of various kinds of double-acting piston and cylinder assemblies, whether hydraulic, pneumatic or hydraulic-pneumatic, and will provide the advantages of quick servicing of working parts. However, the structure described is particularly advantageous when used in connection with air actuated force intensifying piston and cylinder capsules according to the present invention as shown in detail in FIGS. 5 and 6.

It will be seen from the various drawing figures that the piston and cylinder assembly 19 is mounted as a "floating" capsule, embraced between the curved areas 33 and 37 but not secured thereto, so the entire capsule assembly 19 can move in either direction parallel to the axis of rotation of the shaft 11. The bearing surfaces 33 and 37 and the capsule 19 itself are machined for easy sliding motion. As shown in FIGS. 5-8, both ends of the piston and cylinder capsule assembly 19 carry friction shoes or pads 40 for frictional engagement with the plates 17 and 18 when the clutch is engaged. The free floating mounting of the capsule 19 causes the friction shoes 40 to exert equal pressure on both discs 17 and 18.

The capsule assembly 19 has been called double-acting in this description in that both ends carrying the shoes 40 move outward upon actuation and inward upon return. The assembly 19 has a housing 41 with a cylindrical outer wall 42. At one end, the housing 41 is closed by a cover 43 secured to the housing 41 by a plurality of bolts 44, one of which is shown. The cover 43 has a central recess for the friction shoe 40, which can be of an asbestos composition or the like, and a bore 45 is provided through the cover 43 for supplying air to the interior of the housing 41. As shown in FIGS. 4-8, a flexible air hose 46 feeds air under pressure to the capsule 19, and the hose 46 is preferably secured by a threaded fitting 47 at an opening of the bore 45 at the periphery of the cover 43. Reverting to FIG. 3, it will be seen that the main supply line 48 for bringing air under pressure to all of the piston and cylinder capsule assemblies 19 can be a passage through the shaft 12, ultimately connected to a plant air supply, which may typically provide sixty pounds per square inch guage pressure.

At the housing end 49, opposite from the cover 43, there is a working piston 50 which carries a friction shoe 40 in a recess in the piston face 51. It will be seen that piston 50 has a generally cup-shaped head 52 defined by an annular step area facing inwardly at 53, which is slidably fitted within a bore 54 of the housing 41. A boss 55 extends inwardly and axially from the piston head 52.

As best shown in FIGS. 9 and 10, the piston 50 has two diametrically opposed sets of spaced-apart members 56 extending inwardly and axially from the base portion of the annular step 53 which serve to prevent the piston 50 from rotating, as well as to axially guide the piston 50, within the housing 41.

There is an internal piston 57 in spaced, opposed relationship to the inner recess 58 of the cover 43 having wall portions 59 and 60, which extend inwardly and axially. The piston 57 is slidably fitted within the housing 41, serving to guide the piston stroke, but along some of its length the piston 57 is spaced from the housing wall 54 by an annular space 61. Referring now to FIGS. 9 and 10, it will be seen that the wall portion 59 of the piston 57 has a crescent shape when viewed along a line parallel to the longitudinal axis of the assembly 19. Wall portion 60 is also shaped somewhat like a crescent, however, it has a cross-sectional area that is substantially greater than the area of the wall portion 59. Both wall portions 59 and 60 of the piston 57 have two axial slots inwardly extending at 62 for sliding relationship with the leg-like members 56 of the piston 50. In addition, wall portion 60 has an axial slot outwardly extending at 63, and on its arcuate surface 64, wall portion 60 has an axial lip 65 which is slidably fitted within an axial slot outwardly extending at 66 within the housing wall 54. The lateral restraint offered by the lip 65 prevents the piston 57 from rotating within the housing 41, which in turn also prevents the piston 50 from rotating within the housing 41, since the leg-like members 56 are laterally restrained within the slots 62. The inner surface 67 of the wall portion 60 has a gear tooth configuration 68, formed therein, that resembles a rack, adjacent to slot 63 and axially extending along each of the longitudinal sides thereof. The gear tooth configurations 68 could also be formed from rectangular bar shaped members having notched teeth thereon, secured to the surface 67 of the wall portion 60, instead of the unitary construction shown.

The piston 57 is shown as being of the rolling diaphragm type, the diaphragm 69 being mounted at its peripheral area 70 between the cover 43 and the housing wall 42. It will be seen that the diaphragm 69 has a full 180 degree convolution at 71 between the diaphragm edge 70 and its central area overlying the piston 57. The central area of the diaphragm 69 is tightly fitted against the piston 57 by a flat plate member 72 which is secured to the piston 57 by a screw 73. During motion of the piston 57, the diaphragm 69 rolls along the walls defining the annular space 61, as shown by the comparison of FIGS. 5, 6, 7 and 8. A rolling diaphragm, like diaphragm 69, thus provides a relatively long stroke. FIGS. 5 and 7 show a released position of the assembly 19, while FIGS. 6 and 8 show the assembly 19 in extended condition. The friction shoes 40, when new, are spaced close to the friction plates 17 and 18, as shown in FIG. 5, so that engagement of the clutch 10 requires only a very short stroke.

Using air under relatively low pressure, such as manufacturing plant pressurized air at 60 p.s.i.g. permits easy direction and actuation control through air valves which are generally less expensive than hydraulic valves. Pressure can be regulated through an air pressure regulator valve.

A flat member 74, having an arcuate shape in the form of a cam, is rotatably secured at one end thereof to the housing 41 by a pin 75, which is transversely disposed on the longitudinal axis of the assembly 19 within the bores 76 and 77 in the housing wall 42.

As best seen in FIG. 9, the pin 75 has an annular step area at 78 that divides the pin 75 into a first portion 79, which is rotatably secured within the bore 76, and a second portion 80, which is rotatably secured within the bore 77. There are two gear members 81 keyed to the first portion 79 of the pin 75 in spaced relationship on opposite sides of the cam 74, which is also keyed to the first portion 79. The gears 81 mesh with the gear teeth 68 of the piston 57 in a "rack and pinion" arrangement, whereby axial motion of the piston 57 is transformed to a rotary motion of the pin 75 and the cam 74. The rotary motion of the cam 74 is then transformed to an axial motion of the piston 50 because the cam surface 82 of the cam 74 is maintained in sliding frictional contact with the radial surface 83 of the boss 55 on the piston 50. Furthermore, the cam 74 intensifies the force transmitted by the piston 57. Thus, the booster effect allows great force to be exerted by a relatively compact unit.

A coiled spring 84 is positioned around the second portion 80 of the pin 75 having one end thereof secured to the housing 41 at 85, and having its other end secured to the first portion 79 of the pin 75 in the groove 86. The spring 84, which is subjected to a torsional loading when the assembly 19 is in engaged position, as shown in FIGS. 6 and 8, serves as a return spring for the assembly 19 when the air under pressure in the chamber 87 is discharged to disengage the clutch 10.

While a preferred embodiment of the invention has been shown and described, various modifications, changes in size and shape of parts etc., will suggest themselves to those familiar with the art, and such changes are considered to be within the spirit and scope of the invention.

What is claimed is:

1. A mechanism for selectively frictionally coupling two relatively rotatable bodies of the type comprising two parallel friction plates connected to a first one of said bodies transverse to the axis of rotation of said first body, the second of said bodies carrying an expandible fluid actuated piston and cylinder means mounted between said friction plates for engagement of friction members carried by said piston and cylinder means with said friction plates upon expansion of said piston and cylinder means, said piston and cylinder means being mounted to float in a cylinder carrying member on said second body for applying equal force against both said friction plates upon expansion of said piston and cylinder means, wherein the improvement comprises said piston and cylinder means having cam means therein for mechanically intensifying said force against said friction plates upon expansion of said piston and cylinder means, said cam means comprising a cam having an arcuate surface of gradually increasing radius mounted on a pin within said cylinder.

2. The mechanism of claim 1 wherein said first body comprises a rotatable drive shaft and said second body comprises a rotatable output shaft aligned with said drive shaft, whereby the mechanism operates as a clutch.

3. A mechanism for selectively frictionally coupling two relatively rotatable bodies of the type comprising two parallel friction plates connected to a first one of said bodies transverse to the axis of rotation of said first body, the second of said bodies carrying an expandible fluid actuated piston and cylinder means mounted between said friction plates for engagement of friction members carried by said piston and cylinder means with said friction plates upon expansion of said piston and cylinder means, said piston and cylinder means being mounted for sliding movement parallel to the axis of rotation of the first body between a cylinder carrier member secured to said second body and a removable cylinder cap, wherein the improvement comprises said piston and cylinder means having cam means therein for mechanically intensifying said engagement of said friction plates upon expansion of said piston and cylinder means, said cam means comprising a cam having an arcuate surface of gradually increasing radius mounted on a pin within said cylinder.

4. The mechanism of claim 3 wherein said first body compises a rotatable drive shaft and said second body comprises a rotatable output shaft aligned with said drive shaft, whereby the mechanism operates as a clutch.

5. A mechanism for selectively frictionally coupling two relatively rotatable bodies of the type comprising two parallel friction plates connected to a first one of said bodies transverse to the axis of rotation of said first body, the second of said bodies carrying an expandible fluid actuated piston and cylinder means mounted between said friction plates for engagement of friction members carried by said piston and cylinder means, with said friction plates upon expansion of said piston and cylinder means, said piston and cylinder means comprising a plurality of piston and cylinder assemblies equally arcuately spaced around and arranged parallel to the axis of rotation of said first body, wherein the improvement comprises said piston and cylinder means having a cam with an arcuate surface of gradually increasing radius mounted on a pin within the cylinder of each piston and cylinder assembly for mechanically intensifying said engagement of said friction members with said friction plates upon expansion of said piston and cylinder means.

6. The mechanism of claim 5 wherein said first body comprises a rotatable drive shaft and said second body comprises a rotatable output shaft aligned with said drive shaft, whereby the mechanism operates as a clutch.

7. The mechanism of either claim 5 or claim 6 wherein there are four piston and cylinder assemblies.

8. A force intensifying piston and cylinder assembly comprising:
 a cylinder having one closed end and one open end;
 a first piston slidably fitted for generally axial movement within said cylinder near said closed end thereof;
 a second piston slidably fitted for generally axial movement within said cylinder near said open end thereof;
 means for moving said first piston towards said open end of said cylinder; and
 cam means for transferring the axial motion of said first piston to an axial motion of said second piston toward said open end of said cylinder and for intensifying the force transmitted by said first piston.

9. A force intensifying piston and cylinder assembly as set forth in claim 8 wherein said means for moving said first piston toward said open end of said cylinder comprises a rolling diaphragm having a flat central area secured to a radial surface of said first piston, a convolution in rolling contact with the axial surface of said first piston and with the inside wall of said cylinder, and a lip area of said diaphragm being secured in place by a cover of said cylinder at said closed end thereof, said diaphragm and said cover defining an air chamber selectively supplied with air under pressure to actuate movement of said first piston.

10. A force intensifying piston and cylinder assembly comprising:
 a cylinder having one closed end and one open end;
 a first piston slidably fitted for generally axial movement within said cylinder near said closed end thereof;
 a second piston slidably fitted for generally axial movement within said cylinder near said open end thereof;
 means for moving said first piston towards said open end of said cylinder; and
 cam means for transferring the axial motion of said first piston to an axial motion of said piston toward said open end of said cylinder and for intensifying the force transmitted by said first piston;
 wherein said cam means comprises a single cam rotatably secured by pin within said cylinder, said pin being transversely disposed between said first and second pistons on the longitudinal axis of said assembly and rotatably secured at its ends thereof to said cylinder, said cam having an arcuate surface of gradually increasing radius in sliding frictional contact with said second piston, said pin having a pinion gear secured thereon for rotation therewith, said pinion gear cooperatively engaging matching gear teeth axially disposed on said first piston.

11. A force intensifying piston and cylinder assembly as set forth in claim 10 wherein there is a spring coaxially disposed around said pin, said spring being torsionally urged between said cam and said cylinder for retracting said cam and said first piston when pneumatic pressure is reduced inside said cylinder.

12. A force intensifying piston and cylinder assembly comprising:
 a cylinder having one closed end and one open end;

a first piston slidably fitted for generally axial movement within said cylinder near said closed end thereof;
a second piston slidably fitted for generally axial movement within said cylinder near said open end thereof;
means for moving said first piston towards said open end of said cylinder; and
cam means for transferring the axial motion of said first piston to an axial motion of said second piston toward said open end of said cylinder and for intensifying the force transmitted by said first piston;
wherein said means for moving said first piston toward said open end of said cylinder comprises a rolling diaphragm having a flat central area secured to a radial surface of said first piston, a convolution in rolling contact with the axial surface of said first piston and with the inside wall of said cylinder, and a lip area of said diaphragm being secured in place by a cover of said cylinder at said closed end thereof, said diaphragm and said cover defining an air chamber selectively supplied with air under pressure to actuate movement of said first piston;
wherein said cam means comprises a single cam rotatably secured by pin within said cylinder, said pin being transversely disposed between said first and second pistons on the longitudinal axis of said assembly and rotatably secured at its ends thereof to said cylinder, said cam having an arcuate surface of gradually increasing radius in sliding frictional contact with said second piston, said pin having a pinion gear secured thereon for rotation therewith, said pinion gear cooperatively engaging matching gear teeth axially disposed on said first piston.

13. A force intensifying piston and cylinder assembly as set forth in claim 12 wherein there is a spring coaxially disposed around said pin, said spring being torsionally urged between said cam and said cylinder for retracting said cam and said first piston when pneumatic pressure is reduced inside said cylinder.

* * * * *